United States Patent

[11] 3,581,734

| [72] | Inventors | Michael Emanuel Croslin<br>Forest Hills;<br>John Ronald Keller, Babylon, both of, N.Y. |
|---|---|---|
| [21] | Appl. No. | 701,943 |
| [22] | Filed | Jan. 31, 1968 |
| [45] | Patented | June 1, 1971 |
| [73] | Assignee | Phelps Dodge Electronic Products<br>N.Y., N.Y. |

[54] SPHYGMOMANOMETER
11 Claims, 20 Drawing Figs.

[52] U.S. Cl. .................................................... 128/2.05M,
73/398
[51] Int. Cl. .................................................... A61b 5/02
[50] Field of Search ............................................ 128/2.05
AS, 2.05 M, 2.05 MS, 2.05 R, 2.05 A, 2.05 Q

[56] References Cited
UNITED STATES PATENTS

| 3,405,707 | 10/1968 | Edwards | 128/2.05(M) |
| 2,375,059 | 5/1945 | Williams et al. | 128/2.05(AS) |
| 2,827,040 | 3/1958 | Gilford | 128/2.05(AS) |
| 3,118,440 | 1/1964 | DE Dobbeleer | 128/2.05(AS) |
| 3,149,628 | 9/1964 | Bolie | 128/2.05(MS) |
| 3,157,177 | 11/1964 | Smith | 128/2.05(AS) |
| 3,348,534 | 10/1967 | Marx et al. | 128/2.05(MS) |
| 3,349,763 | 10/1967 | Clements et al. | 128/2.05(MS) |
| 3,452,744 | 7/1969 | Van Den Nieuwenhof et al. | 128/2.05(M) |

*Primary Examiner*—Anton O. Oechsle
*Attorney*—Davis, Hoxie, Faithfull & Hapgood ABSTRACT: Blood pressure-indicating apparatus automatically produces persisting displays of arterial systolic and diastolic blood pressure values. An artery-occluding cuff, and a sensing cuff located distal thereto and connected in a closed pneumatic system containing an anemometer wire transducer, cooperate to generate the requisite display meter-latching signals. The systolic pressure is indicated only if a second pulse is detected within the expected time interval after a first detected pulse and is larger than the first pulse. The diastolic pressure is indicated only after the systolic pressure has been indicated and only after a pulse is detected which has a peak value less than 0.7 of the largest previous pulse detected.

3,581,734

SPHYGMOMANOMETER

This invention relates to medical instruments and, more specifically, to a sphygmomanometer for automatically generating persisting systolic and diastolic blood pressure indications.

Sphygmomanometers are a class of medical instrument for measuring arterial blood pressure by an indirect method, i.e., where transducer instruments such as a needle, cannula, catheter, or the like are not directly inserted into the subject's artery. Prior art sphygmomanometers have typically employed an inflatable cuff, having a pressure-indicating manometer connected thereto, in conjunction with a sound-detecting device. For example, in the common manually operated clinical apparatus, a physician or other practicioner wraps the cuff about a subject's upper arm, and inflates the cuff to a pressure great enough to occlude all blood flow in the brachial artery for the entire duration of each cardiac cycle. A valve is then opened to gradually relieve the occluding pressure.

A point is reached where the maximum arterial blood pressure occurring during the periodic closure of the left heart ventricle is equal to the cuff occluding pressure. As the cuff pressure decreases to, and subsequently past such a level, the artery opens for a short interval each heart cycle and a correspondingly short blood pulse flows therethrough. This equal pressure point identifies a subject's systolic blood pressure.

The auscultatory device, typically a stethoscope, is placed on the artery at the subject's forearm, a point more remote (distal) from the heart than the occluding cuff. The artery walls expand responsive to each blood pulse and give rise to what have been designated as Korotkoff audible sounds, which are detected via the stethoscope. The operator, upon noting the inception of these sounds, quickly reads the corresponding instantaneous value of the decreasing manometer column. This yields the systolic information.

As the cuff-occluding pressure decreases further, the diastolic point is reached where the artery remains open for essentially the entire cardiac cycle. Accordingly, the distinct audible sounds generated by the intermittent blood flow essentially disappear after the diastolic point is reached. Hence, after the physician or operator notes the disappearance of the Korotkoff sounds, he again examines the instantaneous manometer reading to derive the subject's diastolic blood pressure.

Prior art automated sphygmomanometers have employed a microphone or the like in place of the clinical stethoscope. The microphone produces electrical pulse replicas of the arterial blood pulses occurring while the pressure in an occluding cuff traverses between the subject's systolic and diastolic values. Pnuematic or electrical meters are supplied with, and latched to systolic and diastolic indications at the inception and the termination of the electrical pulses.

However, prior art manual and automated sphygmomanometers have often given inaccurate, inconsistent and/or unreproducible readings because of background electrical and audible noise signals which are confusingly similar to, and which tend to mask the desired audible sounds. In particular, such noise is internally produced by movement and breathing of the subject, and is externally associated with electrical or mechanical equipment within the environment of an automated sphygmomanometer. Further, inaccurate results obtain from the difficulty in reading a continuously descending manometer column in the case of manually operated sphygmomanometers. Moreover, for both manual and automated structures, ambiguous readings often result since the amplitude of the blood pulses (and of the corresponding Korotkoff sounds) becomes increasingly smaller as the occluding pressure approaches the systolic and diastolic values.

It is therefore an object of the present invention to provide an improved sphygmomanometer for automatically displaying systolic and diastolic pressure values.

More specifically, an object of the present invention is the provision of a reliable, automated electronic sphygmomanometer which generates accurate, reproducible blood pressure readings.

The above and other objects of the present invention are realized in an illustrative sphygmomanometer organization which includes a main pressure cuff for selectively occluding the brachial artery, and a smaller cuff located distal thereto. A pneumatic system inflates the larger cuff above the subject's systolic pressure, and the cuff then gradually deflates. The smaller cuff is included in a closed pneumatic system, exhibiting a relatively small positive pressure, which includes therein an air flow responsive anemometer tungsten wire connected to a pulse transient detecting circuit. A pressure transducer is coupled to the larger cuff and is continuously connected to systolic and diastolic pressure indicating meters.

In system operation, the larger cuff is inflated to occlude the artery. As long as this condition obtains, the distally located smaller cuff and the associated detecting circuitry detect no arterial blood pulses during any part of each heart cycle.

As the larger cuff slowly deflates, a condition is reached where the peak arterial pressure during closure of the left heart ventricle is equal to, and subsequently greater than the occluding cuff pressure. This corresponds to the systolic pressure point when the artery opens for a small period each heart cycle.

The first two blood pulses induce pressure and motion transients in the small cuff which are translated into electrical signals. Such signals activate an electronic sample and hold circuit which constrains the systolic pressure meter to continuously display the systolic reading. The signals also partially enable diastolic pressure-reading circuitry.

As the pressure in the larger cuff decreases, the diastolic circuitry stores the peak amplitude of the largest of the recurring pulses which are continuously detected by the small cuff. When a pulse smaller than approximately 0.7 of the stored peak value is received, indicative of the diastolic pressure at which the artery remains open for the full heart cycle, the diastolic circuit activates a second sample and hold circuit. In response thereto, the diastolic meter is adapted to continuously display the detected diastolic pressure.

As ancillary features, the monitor includes verification circuitry which requires the incidence of two systolic and two diastolic indicating pulses to latch the respective meters, hence avoiding permanent circuit triggering by spurious single transient signals. Also a logarithmic pulse amplifier is employed for reliable circuit triggering.

A complete understanding of the present invention, and of the above and other objects, features and advantages thereof will be gained from a consideration of the following detailed description of an illustrative embodiment thereof presented hereinbelow in conjunction with the accompanying drawing, in which.

Figures 1, 13:
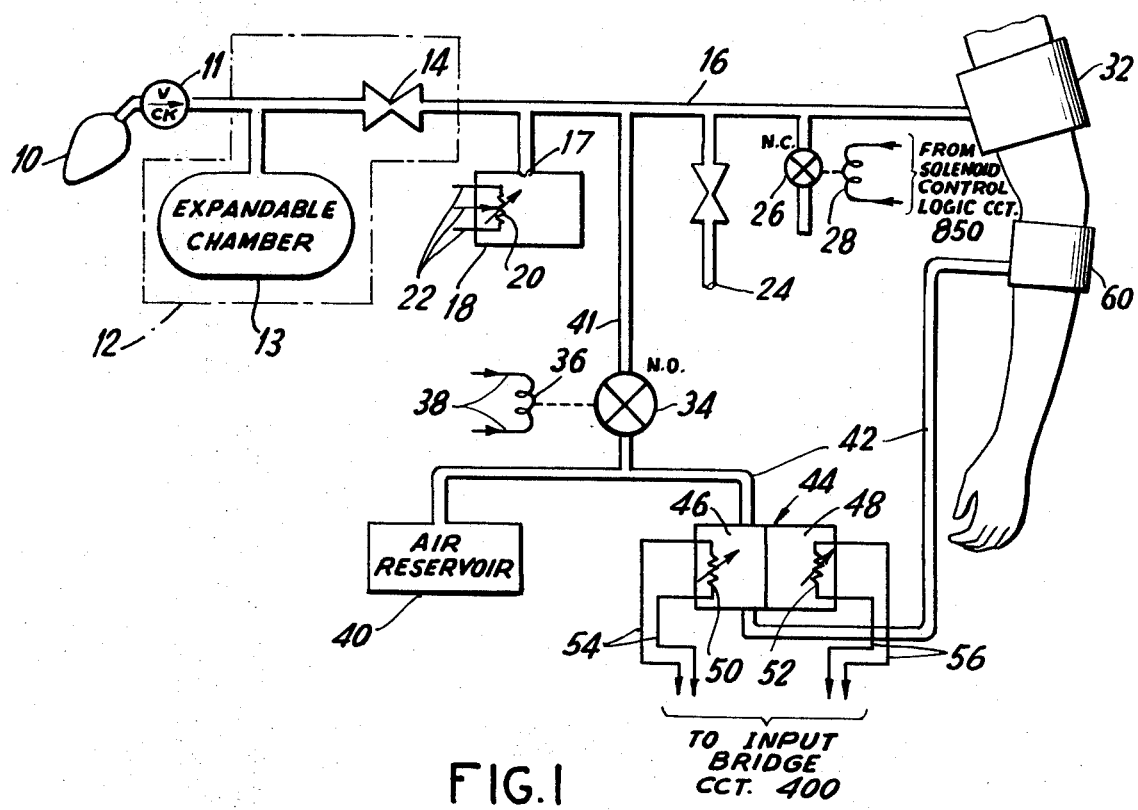
FIG. 1 depicts the pneumatic apparatus included in an automated sphygmomanometer embodying the principles of the present invention.
Figure 2:
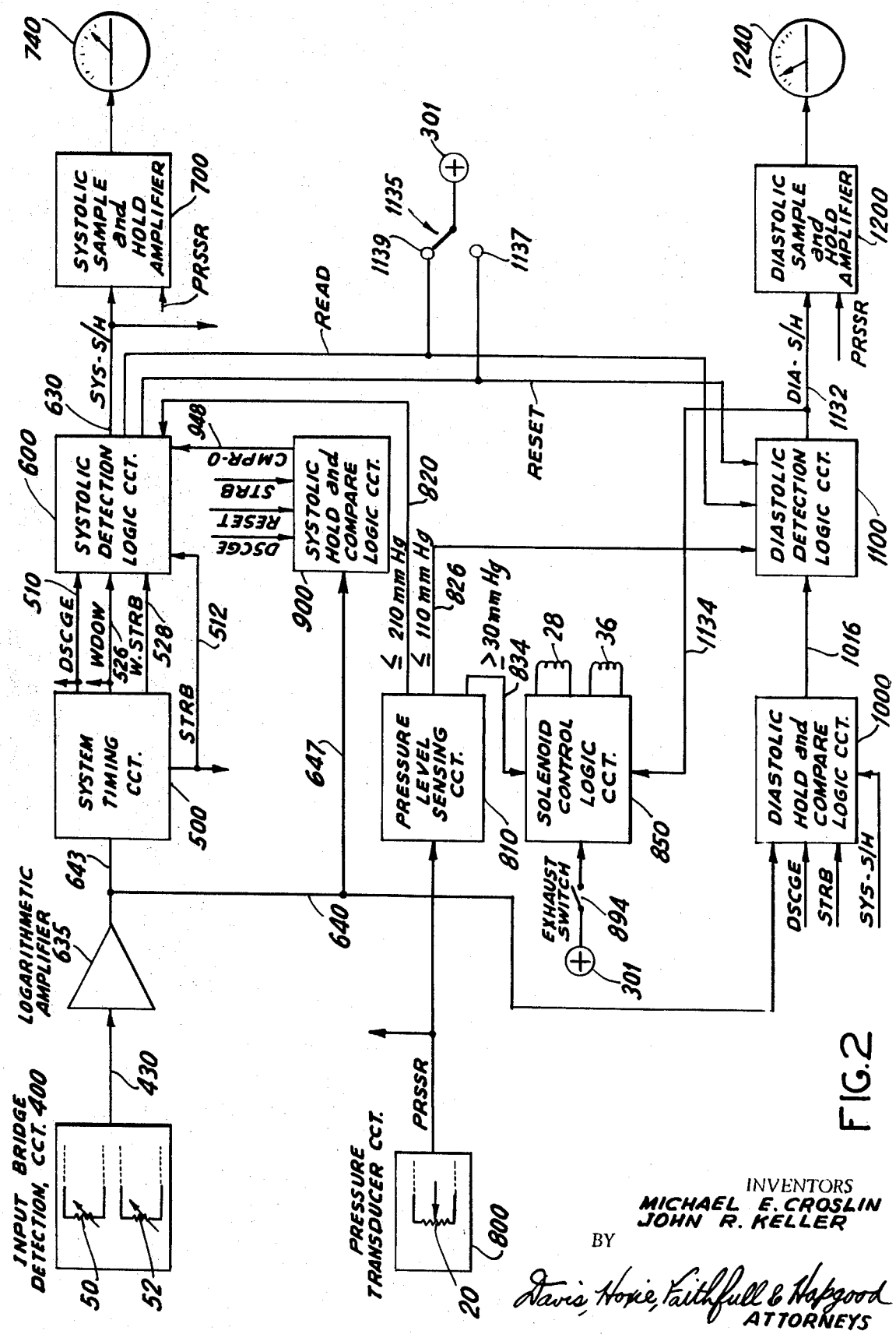
FIG. 2 is a block diagram illustrating the electronic portion of an illustrative automated sphygmomanometer.

FIGS. 4 through 12 comprise a schematic diagram of the circuitry shown in block form in FIG. 2; and FIG. 13 depicts the spacial organization of FIGS. 4 through 12.

Throughout the drawing, like numbers in different figures identify the same system element. Also, where reference numerals employing three or four figures are employed, the first or first two numbers identify a particular figure in the detailed schematic drawing of FIGS. 4 through 12 where the element is located.

Referring now to FIG. 1, there is shown in symbolic form the pneumatic apparatus included in an illustrative sphygmomanometer embodying the principles of the present invention. A pressure bulb 10 is employed to selectively inflate a relatively large, brachial artery occluding cuff 32, securably on a subject's upper arm, through a primary conduit 16. The bulb 10 also inflates a smaller cuff 60, distally located on the subject's lower arm, via the conduit 16, a normally open valve 34, conduits 41 and 42, and a chamber 46 included in a metallic block 44.

The pressure bulb 10 is connected to the conduit 16 through a check valve 11 and a pneumatic integrator 12 which includes a relatively small orifice 14 and an expandable chamber 13. As the bulb 10 is constricted, the pressure impulses pass through the valve 11, but are blocked from the conduit 16 by the relatively small orifice 14. Accordingly, each pressure impulse is operative to expand the chamber 13. In the interval between constrictions of the bulb 10, the relatively high pressure in the chamber 13 is gradually dissipated into the conduit 16 through the orifice 14. Hence, the pressure characterizing the composite pneumatic system increases gradually and the sharp constrictions of the pressure bulb 10 are not passed to the subject through the cuffs 32 and 60, thus minimizing his discomfort. Also, such sharp transients are prevented from prematurely isolating the pulse detecting described below.

After the pressure in the pneumatic system reaches approximately 30 mm. Hg., a solenoid winding 36 is energized by a solenoid control logic circuit 850 FIGS. 2 and 8) described hereinafter. Responsive thereto, the normally open valve 34 closes, thereby isolating a closed detecting pneumatic system which includes the detecting cuff 60, a nonflexible air reservoir 40 and. intermediate the foregoing, the conduit 42 and the metallic chamber 46. This detecting system essentially remains under a pressure of 30 mm. Hg. for the remainder of the operative blood pressure-monitoring cycle.

The bulb 10 is further constricted by the operator to inflate the occluding cuff 32 to a pressure above 210 mm. Hg. This exceeds the highest systolic pressure value which will normally be encountered, and which is thereby sufficient to fully occlude the brachial artery of the subject. Accordingly, with the above condition obtaining, no blood flows through the artery under the distal sensing cuff 60 for any part of the cardiac cycle.

A permanently open exhaust orifice 24 is connected to the conduit 16 to slowly relieve pressure in the artery occluding cuff 32, for example at a rate of 2—4 mm. Hg. per second. The orifice 24 does not significantly affect inflation of the cuff 32 since the average rate of pressure increase is much greater than the exhaust rate characterizing the orifice 24. A pressure sensitive potentiometer 20 is included in a chamber 18 connected to the conduit 16, via a pressure sensitive diaphragm 17, and thereby also connected to the large cuff 32. Three leads 22 connect the transducer 20 to the electronic apparatus of the present invention which is thus continuously supplied with information identifying the instantaneous pressure in the occluding cuff 32.

The metallic element 44 associated with the detecting apparatus includes two like isolated chambers 46 and 48 therein, with these chambers respectively including two substantially identical temperature responsive, variable resistance anemometer wires 50 and 52. The tungsten wires 50 and 52 are respectively connected via leads 54 and 56 to differing arms of an input bridge circuit 400 illustrated in FIGS. 2 and 4.

When the occluding pressure in the cuff 32 reduces to a level equal to, and subsequently less than the subject's systolic pressure, blood pulses flow through the brachial artery during the closing of the left ventricle each heart cycle, as above described. These blood pulses enlarge the artery, and thus cause a slight expansion of the inner wall of the detecting cuff 60, i.e., the cuff portion nearest the subject's arm. The expansion of the inner cuff wall affects an air redistribution, i.e., a movement of a part of the air formerly contained in the cuff 60 toward the reservoir 40 through the closed pneumatic detecting structure which includes the chamber 46 (but does not include the companion chamber 48). The airflow through the chamber 46 cools the wire 50 which has been heated by a bridge current flowing therethrough, and the resistance of the wire 50 thus decreases. Correspondingly, the resistance of the wire 52 does not change as there is no airflow therepast responsive to the blood pulses. Since the resistance of the tungsten wire 50, but not that of the wire 52, decreases during each blood pulse, the bridge circuit 400 of FIGS. 2 and 4 including these elements becomes unbalanced at such times. Thus, information signals identifying the incidence of blood pulse is communicated by the pneumatic system and anemometer wires 50 and 52 of FIG. 1 to the electronic apparatus of FIG. 2 and FIGS. 4 through 12. Further, since the amount of airflow, and thereby also the resistance change for the wire 50, is a direct function of the wall displacement in the brachial artery, signals identifying the relative size of the blood pulse is also communicated to the electronic equipment. The temperature differential between the wires 50 and 52 effected during each blood-flowing pulse is rapidly dissipated between pulses such that the input bridge regains its quiescent balanced state in the interim between signals.

To complete the pneumatic system of FIG. 1, a normally closed valve 26 is selectively operated by a solenoid winding 28 to relieve all pressure in the cuffs 32 and 60, and in all elements associated therewith, at the end of a blood pressure-monitoring cycle of operation, i.e. after the diastolic reading has been taken. The valve 34 is returned to its normally open state responsive to the associated winding 36 being deenergized during each such pressure relieving operation to dissipate the 30 mm. Hg. formerly present in the closed detecting apparatus. Finally, the valve 26 returns to its normally closed state, and the composite pneumatic system of FIG. 1 is reset to its initial condition, ready to take a new reading when the bulb 10 is again positively constricted.

Figure 4:
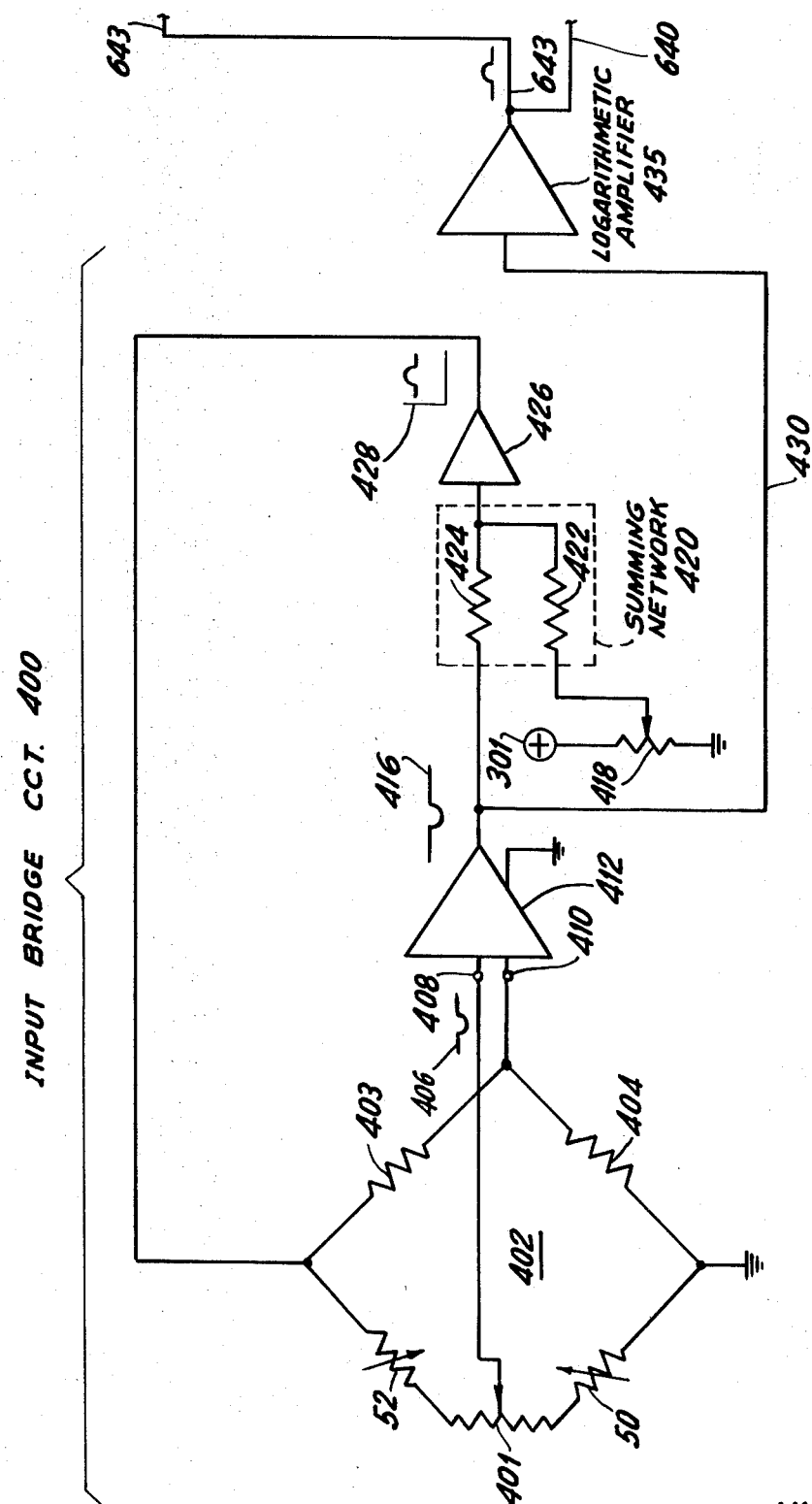
Figure 5:
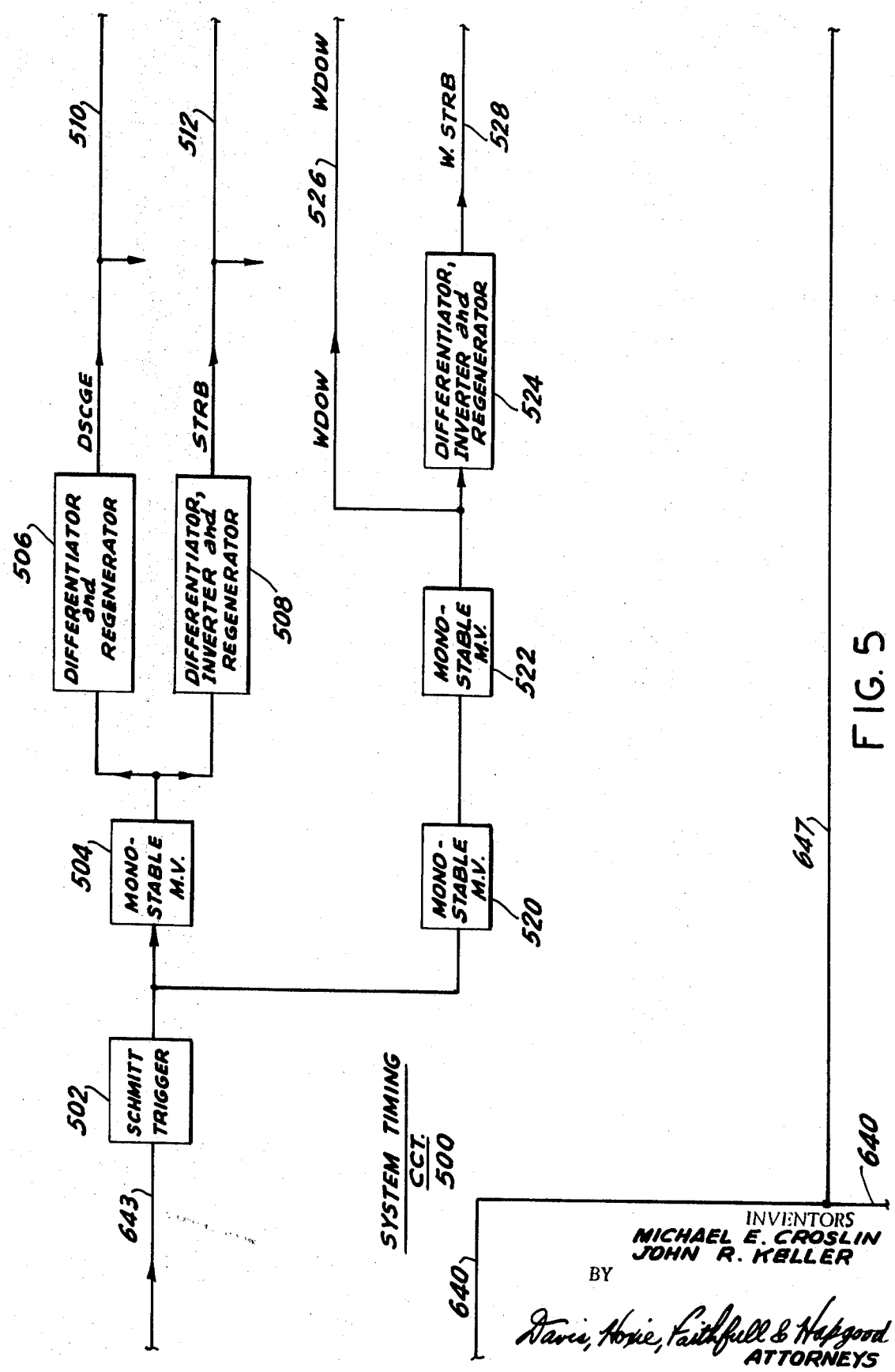

Turning now to a block diagram of the electronic portion of the instant sphygmomanometer shown in FIG. 2, an input bridge circuit 400 includes the anemometer resistors 50 and 52 in differing, adjacent arms of an electronic bridge (structure 402 in FIG. 4). When the resistance of the wire 52 decreases responsive to the cooling airflow produced by a blood flow in the brachial artery, the bridge becomes temporarily unbalanced, and an output voltage signal is impressed on an output lead 430.

Figure 3:
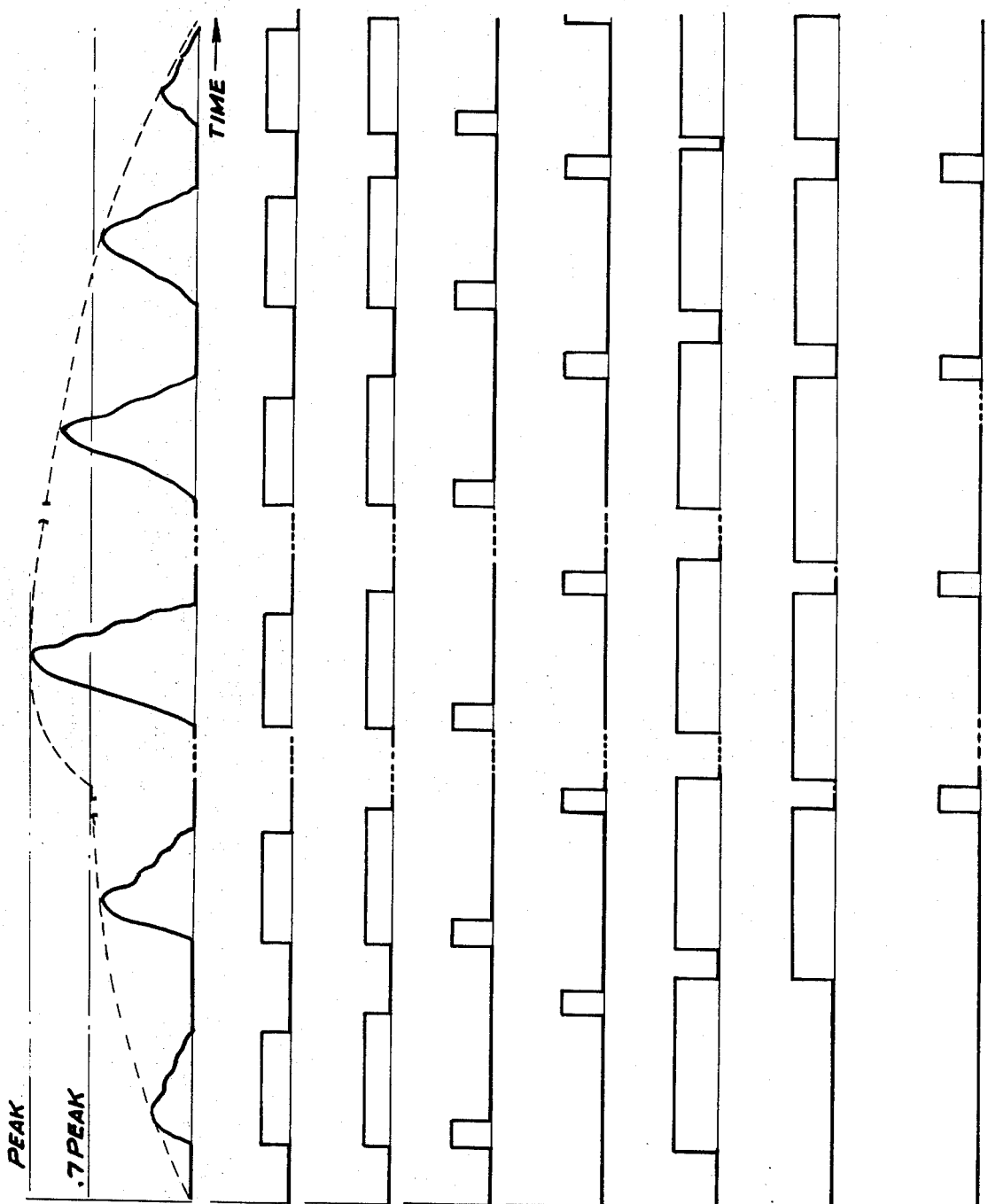
FIGS. 3A through 3H are time graphs characterizing selected system elements included in the arrangement of FIGS. 2 and 4—12.

This signal is amplified by a logarithmic amplifier 635 and supplied to a system-timing circuit 500 via a lead 643; to a diastolic hold and compare logic circuit 1000 via lead 640; and to a systolic hold and compare logic circuit 900 via leads 640 and 647. The logarithmic property of the amplifier 635 serves to compress the dynamic range of the input signals which widely vary with the physical characteristics of the subject, for example with age, sex and weight. Accordingly, weaker signals will undergo relatively greater amplification than stronger signals. Thus, the several circuits supplied with this input signal are triggered in a reliable manner without being overdriven or saturated. The amplified electrical replicas of the periodic arterial wall motion produced when the occluding pressure decreases from the systolic to the diastolic level are shown in FIG. 3A. The width of the pulses is expanded in time relative to the duration between consecutive pulses in FIG. 3A, and thereby also in FIGS. 3B through 3H discussed below, for purposes of clarity.

The system-timing circuit 500 operates on each input signal pulse appearing on the lead 643 by generating a plurality of timed output waveforms which are utilized by the other functional organizations to effect various system operations. More specifically, as seen in FIGS. 3A and 3D, discharge (DSCGE) pulses are generated during the beginning portion of each input (arterial blood flow) signal. Similarly, strobe (STRB) output pulses (FIG. 3E) are generated a fixed time interval from each discharge signal after the corresponding input pulse terminates. A window (WDOW) gate signal (FIG. 3G) is generated responsive to each input pulse and attains its relatively high state during a time interval which encompasses the period when the next blood pulse is to be expected. Finally, a window strobe (W.STRB) pulse is generated at the termination of each window (WDOW) gate.

A systolic detection logic circuit 600 and the systolic hold and compare logic circuit 900 cooperate to produce an output signal (SYS-S/H) on a lead 630 which selectively latches a systolic blood pressure indicating meter 740 to display the proper systolic pressure value. In particular, the meter 740 is latched to the instantaneous occluding pressure in the large cuff 32, continuously supplied by a pressure transducer circuit 800 employing the pressure sensitive potentiometer 20, when the SYS-S/H signal is high. As long as this condition obtains, a systolic sample and hold amplifier 700 will essentially lock the meter 740 to the reading present when the SYS-S/H signal attained its high state irrespective of any changes in the occluding cuff pressure output signal (PRSSR) of the circuit 800. Conversely, when the systolic SYS-S/H signal is low, i.e., when a relatively low potential appears on the lead 630, the systolic sample and hold amplifier 700, and the meter 740 connected thereto, will rapidly attain and track the instantaneous value of the PRSSR signal.

In accordance with the above principles, the circuits 600, 700 and 900 will provisionally latch the meter 740 to the systolic pressure (PRSSR) value obtaining at the inception of the first blood pulse which occurs after the brachial artery has been fully occluded by the large cuff 32, and after the occluding pressure has been gradually relived through the exhaust orifice 24. To prevent final locking of the systolic meter 740 by a spurious signal, caused by movement of the subject, background electrical noise or the like, final locking of the meter 740 requires that the systolic hold and compare logic circuit 900 detect the incidence of consecutive input signals from the amplifier 635 occurring within a proper time interval determined by the expected range of heart cycle periods. Further, in view of the normal input signal pattern shown in FIG. 3A, the circuits 600 and 900 further require for locking that the second pulse be larger than the first pulse. When final triggering does occur after a proper second signal pulse is detected, the meter 740 is locked to the desired systolic pressure, i.e. the PRSSR value present at the inception of the first of the two input signals.

To effect the above mode of operation the DSCGE pulse signifying the beginning of the first input signal generates a high SYS-S/H signal to latch the meter 740 which thus displays a provisional systolic reading. This discharge pulse also enables a gate in the circuit 900 such that the peak amplitude of the input signal waveform is retained in a storage capacitor. The peak amplitude of the following input signal is similarly stored in another capacitor in the circuit 900 and the two stored peak values are compared by a difference amplifier which generates a comparison output signal (CMPR-O). If the second pulse was detected as properly being larger than the first, (a positive CMPR-O signal); if the second pulse came in the proper time range (indicated by a coincidence of DSCGE and WDOW signals); if a read-reset transfer switch 1135 has been set to the READ mode state; and if a pressure level-sensing circuit 810 detected an occluding cuff 32 pressure of less than 210 mm. Hg. (below the usual upper bound of expected systolic pressures), then the systolic logic circuit 600 locks the SYS-S/H signal on the lead 630 to its high value. This combination of signals verifies the provisional systolic pressure reading which is thus retained as a display by the meter 740.

The two irregular conditions which may be encountered in practice are also processed by the circuits 600 and 900. First, if the first input signal was spurious, i.e., caused by motion of the subject or the like, a second input signal will not be detected in the proper time interval. This is indicated by a W.STRB pulse (generated responsive to the first input signal) which is not shortly preceded by the DSCGE pulse of the second input signal. When this signal pattern is encountered hence identifying a spurious first pulse, the circuits 600 and 900 are returned to their initial condition to await a proper systolic pressure identifying first pulse.

The other irregular condition occurs when two input signals are received in a proper time relationship, but where the second is smaller in amplitude than the first. This is identified by the coincidence of strobe and window pulses, but where the relative signal amplitude examining CMPR-O signal is not high, or negative. When this occurs, the first pulse is disregarded and the second pulse is treated as being a new "first," provisional systolic pressure-signifying signal. Accordingly, the circuits 600 and 900 look for the next pulse in a proper time slot, and with a proper amplitude, following this "first" input signal. Also, the SYS-S/H level is reset to its initial low value for a short interval to permit the meter 740 to attain the PRSSR value present when the new "first" pulse was received.

We have discovered that reliable diastolic blood pressure readings can be locked in a diastolic pressure indicating meter 1240 when an input signal is detected having a peak amplitude 0.7 or less of the largest peak amplitude of the input signal train (see FIG. 3A). To this end, a diastolic hold and compare logic circuit 1000 includes envelope-detecting circuitry for retaining the peak amplitude of the most recently encountered blood pulse signal connected thereto by the lead 640. The circuit 1000 also includes scaling and peak detecting circuitry for storing a voltage level 0.7 times, or 3 db. less than the peak amplitude of the largest of the pulses encountered while a reading is being taken.

A difference amplifier is employed in the circuit 1000 to generate an enabling signal when the peak amplitude of the most recent pulse falls below the stored value of 0.7 of the largest pulse. Once generated, this enable signal passes all succeeding STRB pulses generated for each input signal to a lead 1016. Since the diastolic reading is taken after the systolic value has been encountered, a relatively high SYS-S/H signal, indicative of a latched condition for the systolic meter 740, is required before an output can be generated by the diastolic hold and compare logic circuit 1000.

The output STRB pulse train present on the lead 1016 if the diastolic point has been reached is connected to a diastolic detection logic circuit 1100. For verification purposes, the circuit 1100 awaits the reception of two incoming STRB pulses. If two pulses are received; if the pressure level sensing circuit 810 signals the logic circuit 1100 via a lead 826 that the occluding cuff pressure is less than 110 mm. Hg. (above the anticipated maximum diastolic pressure); and if the read-reset switch 1135 is in the READ mode (thereby generating a high READ signal); the logic circuit 1100 will generate a relatively high DIA-S/H signal on an output lead 1132. If all of the above-noted conditions are not satisfied, the DIA-S/H signal will be low.

Following a mode of circuit functioning identical to that disclosed above with respect to the systolic system components 700 and 740, a diastolic sample and hold amplifier 1200 and a diastolic pressure indicating meter 1240 will track the instantaneous occluding cuff pressure PRSSR if the DIA-S/H output signal of the circuit 1100 on the lead 1132 is low, and lock the meter 1240 if the DIA-S/H signal is high. Accordingly, the meter 1240 is locked to continuously display the diastolic pressure of the subject after the diastolic detection logic circuit 1100 responds to two input STRB pulses by energizing the lead 1132.

A solenoid control logic circuit 850 is employed to selectively energize the valve solenoid windings 28 and 36 which respectively operate the normally closed exhaust valve 26 and the normally open small cuff-detection system-isolating valve 34. In particular, the normally open valve activating winding 36 is energized while the occluding pressure level-sensing circuit 810 detects a pressure (PRSSR) value of at least 30 mm. Hg. The solenoid control circuit 850 energizes the winding 28 to rapidly relieve pressure from the entire pneumatic system after both the systolic and diastolic readings have been determined, signified by a high DIA-S/H signal. The winding 28 can also be energized at the will of the operator, e.g., for emergency situations, by simply closing an exhaust switch 894.

Thus, the organization depicted in FIGS. 1 and 2 has been shown by the above to automatically display systolic and diastolic blood pressure readings on two meters 740 and 1240.

Moreover, the arrangement includes verification requirements to ensure reliable and accurate output values. Further, the apparatus may be operated by unskilled personnel who are simply required to attach the cuffs 32 and 60 to the subject's arm, pump the pressure bulb 10 at any convenient rate to an occluding pressure exceeding 210 mm. Hg. and to automatically generate the desired readings by throwing the switch 1135 from the reset, to the read mode. After the readings have been taken the operator again throws the transfer switch 1135 into the reset setting. The composite sphygmometer is then ready to begin a new cycle of operation.

The particular manner in which each of the functional blocks shown in FIG. 2 performs its indicated operations may be understood from FIGS. 4 through 12 which comprise a detailed schematic diagram of the instant blood pressure monitor.

The input bridge circuit 400 of FIG. 4 includes a bridge configuration 402 which includes the active and control temperature sensitive, variable resistance anemometer wires 50 and 52 in differing branches thereof. The voltage across the bridge is produced by a direct current amplifier 426 whose output voltage is proportional to the output of a summing network 420 which includes summing resistors 422 and 424. The output of the bridge 402 is connected to a difference amplifier 412.

To attain its quiescent state, the bridge 402 is balanced by adjusting a potentiometer 401; the bias levels in the difference amplifier 412 are arranged to supply a zero output voltage to the summing resistor 424; and a potentiometer 418 is set such that the direct current amplifier 426 applies the desired acquiescent voltage across the bridge 402. The aforementioned elements may then be readjusted several times until the indicated conditions are met.

When the bridge 402 is unbalanced by an airflow past the tungsten anemometer wire 50 responsive to a blood pulse constricting the detecting cuff 60, the resistance of the elements 50 decreases, hence applying the negative waveform 406 of FIG. 4 to an input terminal 410 on the difference amplifier 412. In turn, the amplifier 412 produces an amplified negative pulse 416 to the summing resistor 424, and thereby also to the amplifier 426. The direct current amplifier 426 inverts the input signal pulse, and thus temporarily increases its output voltage (see wave 428) which is applied across the bridge 402.

The fed back, increased bridge voltage operates to increase the frequency response of the input anemometer bridge 402. More specifically, the increased voltage gives rise to an increased current through the anemometer wires 50 and 52. The wires 50 and 52 are advantageously adapted to exhibit a non-linear temperature characteristic such that the current increment produces a greater rise in temperature in the previously cooled wire 50 than in the control wire 52. Hence, the wires 50 and 52 more quickly return to an equal resistance, balanced bridge state than would otherwise be the case.

The output from the difference amplifier 410 is also supplied via the lead 430 to the logarithmic amplifier 435 where the blood pulse indicating signal is amplified and inverted. The amplifier 635 distributes the amplified signal version of the Korotov sounds, i.e., the artery wall displacement to the system timing circuit 500 through the lead 643; to the systolic hold and compare logic circuit 900 by way of the leads 640 and 647; and to the diastolic hold and compare logic circuit 1000 via lead 640.

The input pulses (FIG. 3A) to the system timing circuit 500 are first operated on by a Schmitt trigger 502 where they are squared, as shown in FIG. 3B. The output of the Schmitt circuit 502 triggers a monostable multivibrator 504 which regenerates pulses of a fixed width (FIG. 3C). Differentiator and pulse regenerator circuits 506 and 508 respectively operate on the leading and trailing edges of the output of the multivibrator 504 to produce a discharge (DSCGE) pulse (FIG. 3D) at the beginning of each input pulse of FIG. 3A, and to generate a strobe (STRB) pulse (FIG. 3E) following the end of the input pulse.

Two cascaded monostable multivibrators 520 and 522 are also triggered by the output of the Schmitt circuit 502 to respectively produce the waveforms of FIGS. 3F and 3G. The timing of the circuits 520 and 522 is adjusted so that window (WDOW) gate generated by the monostable circuit 522 responsive to each pulse persists in a high state during a time range during which the next pulse is expected. Finally, the differentiator inverter and regenerator circuitry 524 operates on the trailing edge of the WDOW gate pulses to produce the window strobe (W.STRB) pulses. The timing signals generated by the system timing circuit 500 are distributed to the other functional members for the uses and purposes discussed herein.

Figure 8:
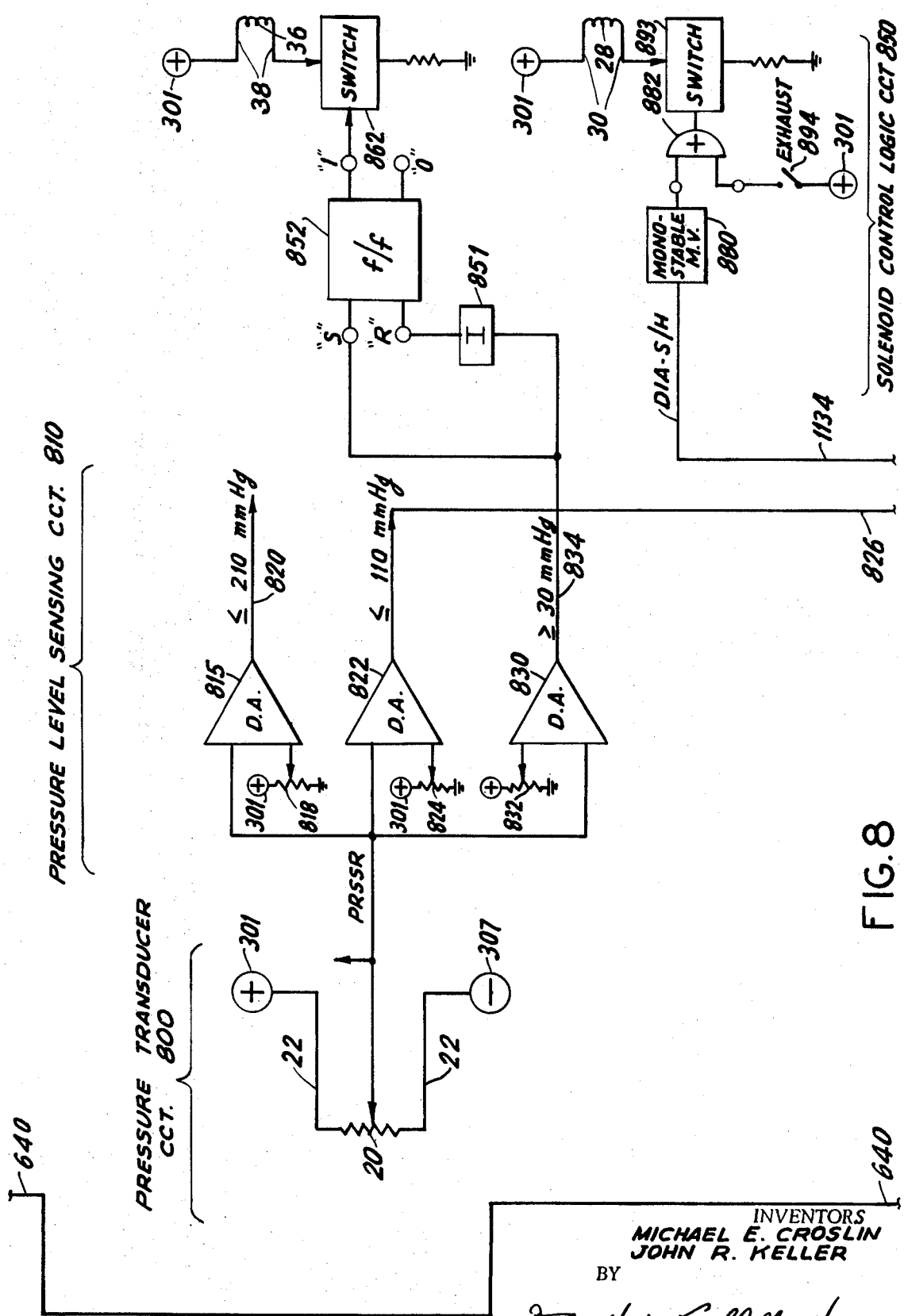

The potentiometer 20, having a tap thereon which attains a setting determined by the pressure in the occluding cuff 32, has positive and negative voltage sources 301 and 307 connected to its fixed terminals, as shown in the pressure transducer circuit 800 of FIG. 8. The instantaneous voltage characterizing the sliding tap comprises the PRSSR signal which supplies an electrical indication of the instantaneous pressure in the occluding cuff 32.

The pressure level sensing circuit 810 includes three difference amplifiers 815, 822, and 830 each having as one input thereon the PRSSR signal, and as their other input a differing DC level. The differing DC levels are adjusted by setting potentiometers 818, 824 832. The outputs of the difference amplifiers 815, 822, and 830 respectively attain a high voltage condition when the PRSSR signal corresponds to cuff 32 occluding pressures less than 210 mm. Hg.; less than 110 mm. Hg.; and more than 30 mm. Hg. The outputs of the difference amplifiers 815, 822, and 830 are low otherwise.

When the occluding cuff 32 is inflated responsive to pumping the pressure bulb 10, a flip-flop 852 in the solenoid logic control circuit 850 is set after the difference amplifier 830 signals that a pressure level of 30 mm. Hg. has been attained. The resulting high voltage at the "1" output terminal of the flip-flop 852 activates a switch 862 allowing current to pass through the normally open valve solenoid winding 36. This closes the valve 34 to isolate the closed pulse detecting pneumatic apparatus under a pressure of about 30 mm. Hg.

After the pressure has been elevated above 210 mm. Hg., the operator throws the read-reset switch 1135 to a read position, hence generating a high READ signal and a low RESET signal. As the pressure is relieved through the exhaust orifice 24 to a level below 210 mm. Hg. the output of the difference amplifier 815 attains a high state. Accordingly, an AND gate 619 in the systolic detecting logic circuit 600 is partially enabled to place a systolic triggering flip-flop 620 in a setable condition. The flip-flop 620, and the other bistable circuits employed in the instant composite sphygmomanometer, initially reside in their reset state, with a relatively low "1" output and a relatively high "0" output. Such an initial condition is attained by energizing the reset terminal of the flip-flops, either directly or through OR logic, when the switch 1135 is placed in the reset position following a complete pressure reading operation. The "1" output of the flip-flop 620, initially low, comprises the SYS–S/H signal which selectively constrains the systolic pressure-indicating meter 740 to operate in a sample (track) or hold (latch or lock) mode.

The first input signal pulse supplied by the logarithmic amplifier 635 to the systolic logic circuit 900 via the leads 640 and 647 after the switch 1135 has been placed in the read position, and after the fully inflated cuff 32 has exhausted to 210 mm. Hg., is provisionally treated as indicating that the systolic pressure has been reached. Accordingly, the DSCGE pulse generated by this input signal sets the systolic triggering flip-flop 620 via the lead 510, an OR gate 610 and the AND gate 619. The resulting high SYS–S/H output of the flip-flop 620 "1" terminal provisionally latches the systolic pressure indicating meter 740 to the instantaneous PRSSR value in a manner described below.

The systolic hold and compare logic circuit 900 includes a two state commutating switch 920 to initially close contacts 922b, 924b and 926b coupled thereto. A short interval after each STRB pulse is encountered at the end of each blood pulse, which delay is effected by a monostable multivibrator 919, the commutating switch 920 is adjusted to alternately close the contacts 922a, 924a, and 926a, and then the alternate transfer contacts 922b, 924b, and 926b. The commutating element 920 and the transfer switch elements 922, 924, and 926 may comprise, for example, a two state mechanical stepping switch with ganged transfer contacts or a toggle flip-flop having the two outputs thereof connected to alternate ones of three companion pairs of AND logic gates.

Figure 9:
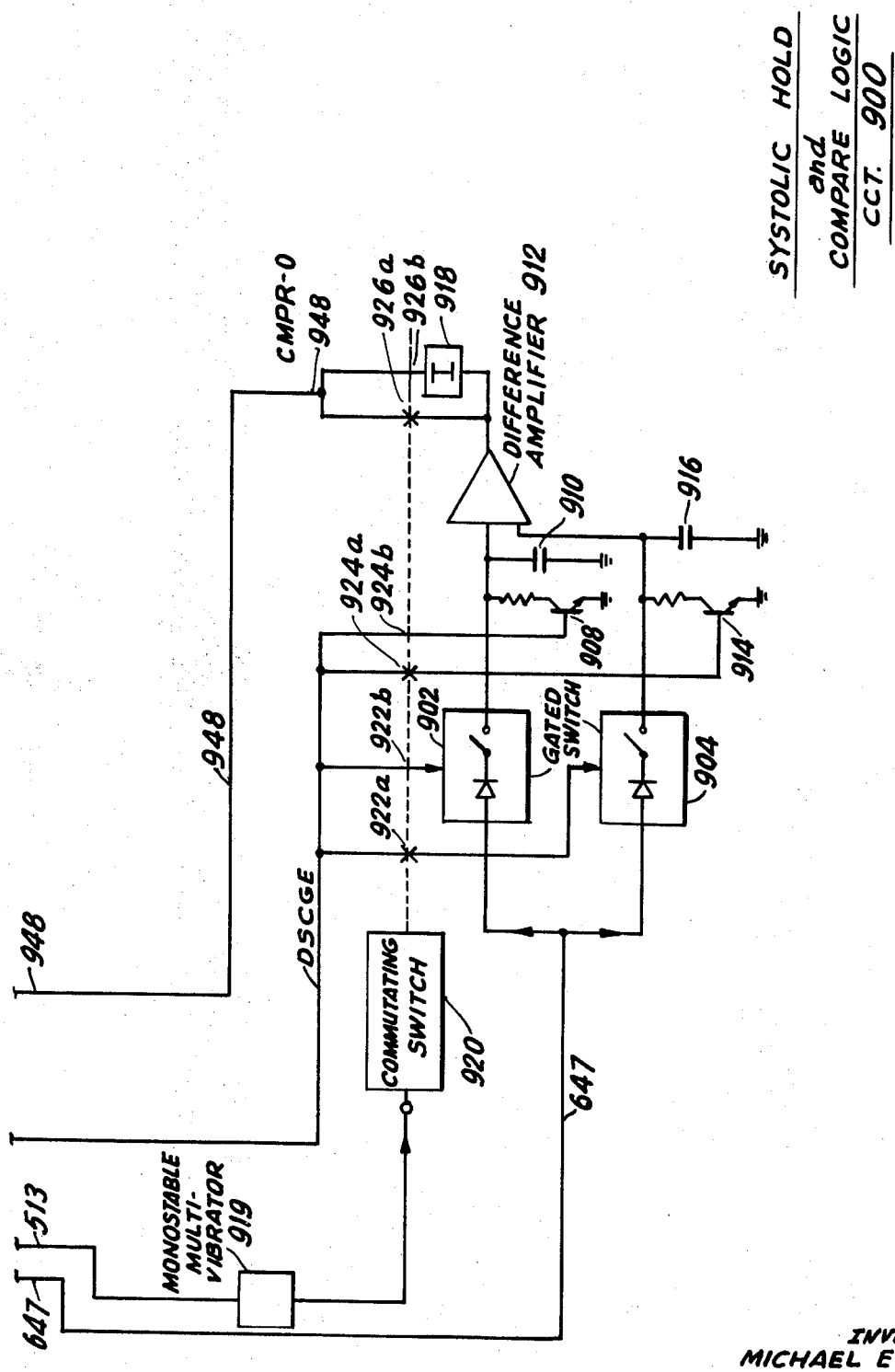
Figure 10:
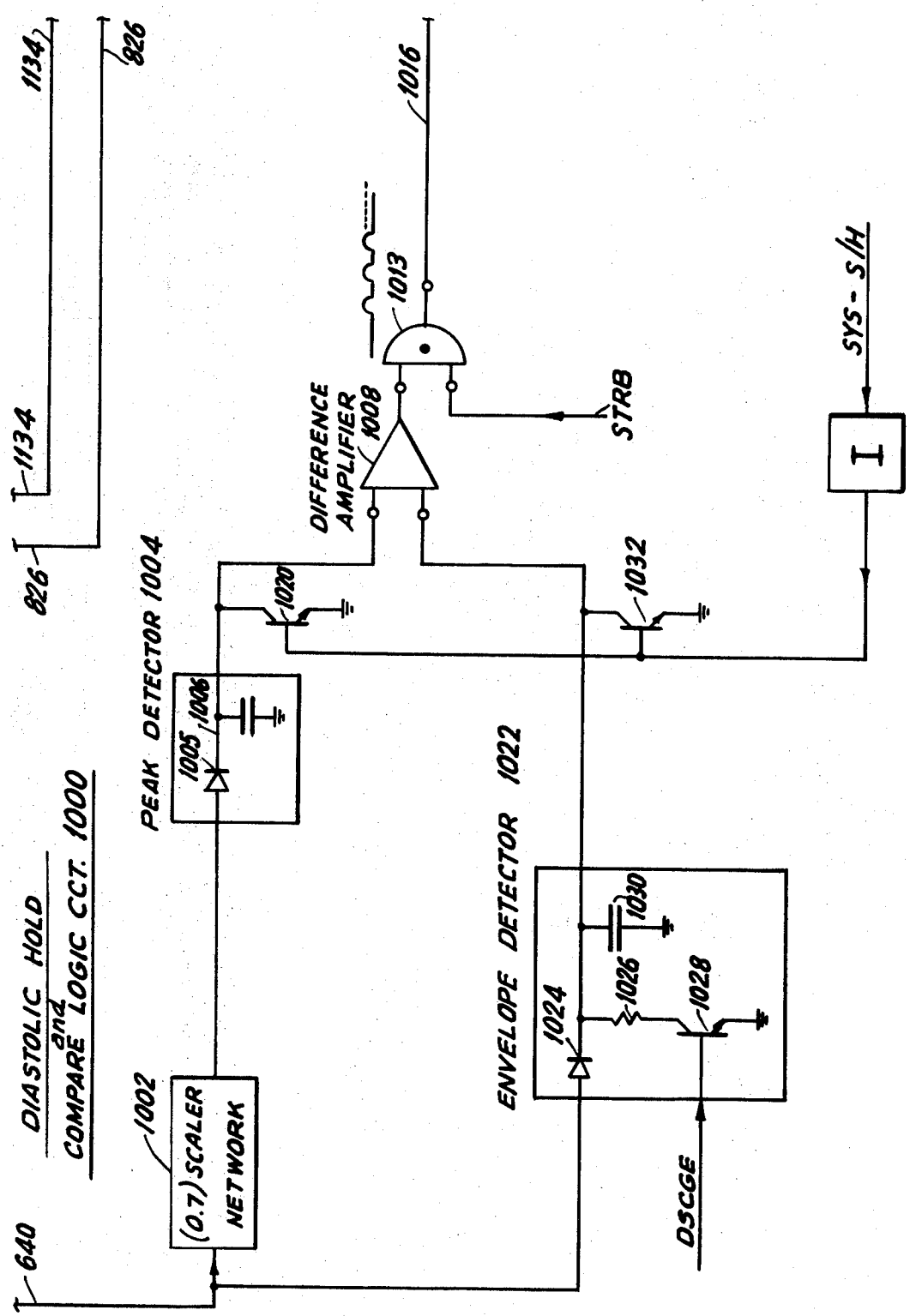
Figure 11:
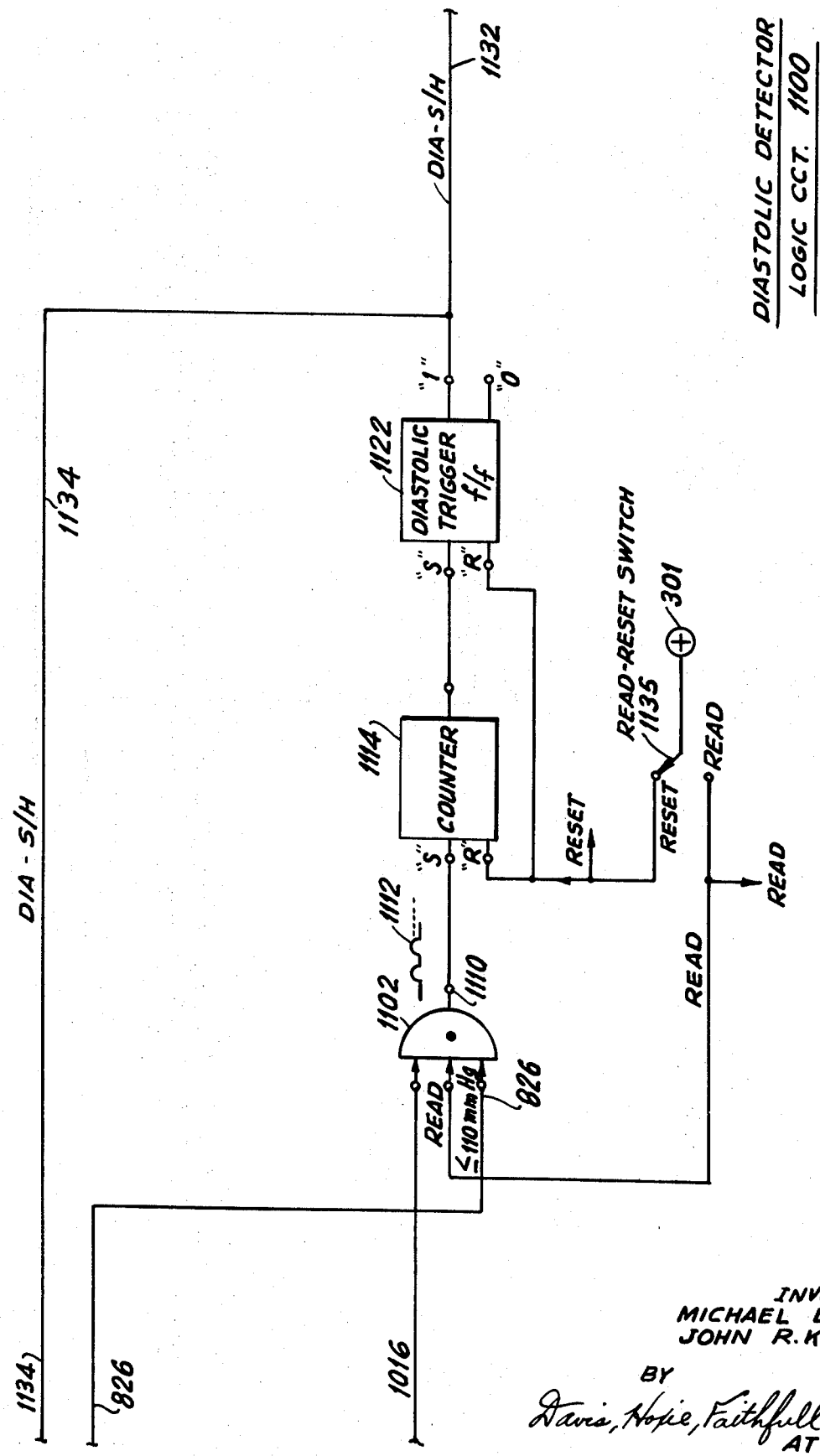
Figure 12:
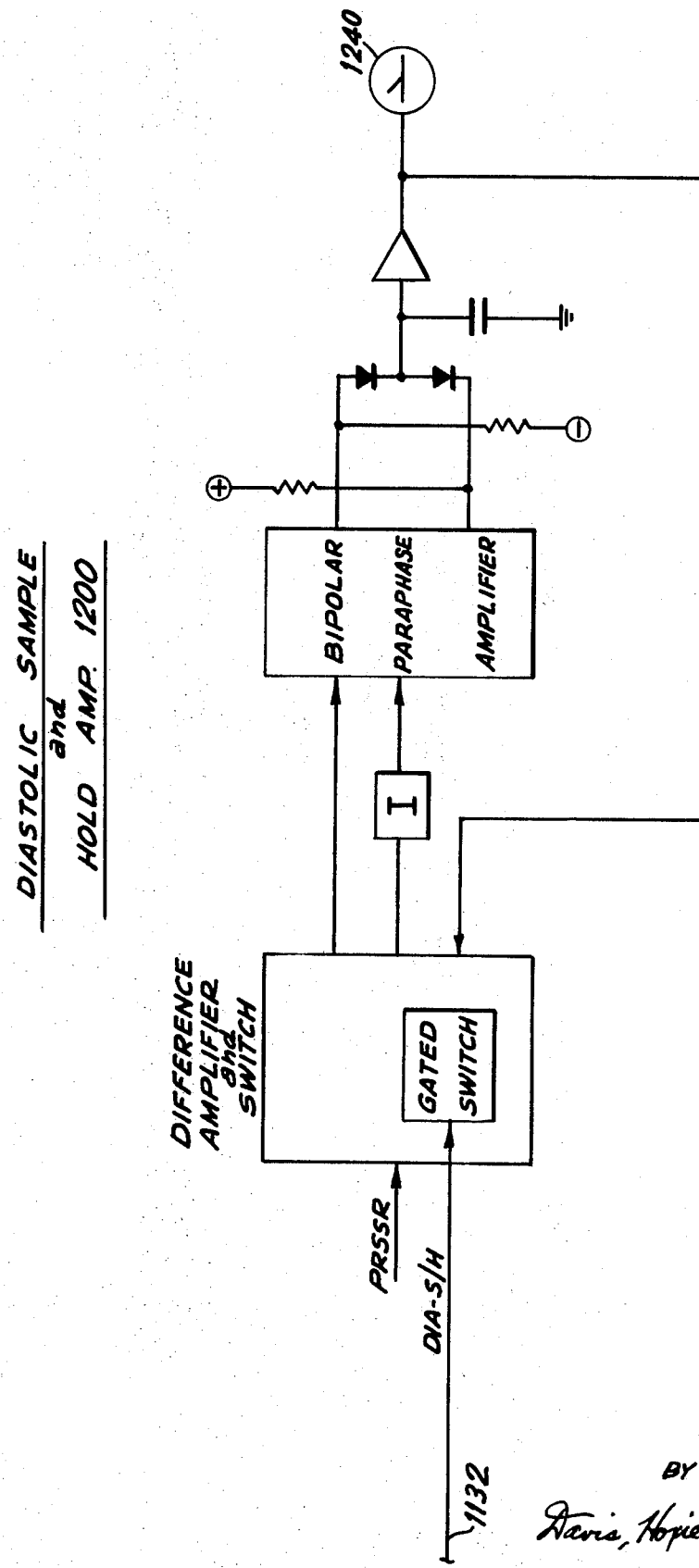

The electrical replica of the first detected blood pulse is supplied to the inputs of two unilaterally conducting gated switches 902 and 904 included in the logic circuit 900 of FIG. 9. The gated switches may comprise, for example, junction or field effect transistors. The amplitude of the first pulse is stored in a capacitor 910 responsive to the gate 902 having been energized by the discharge (DSCGE) pulse associated with the first input signal, and connected to the gate through the closed symbolic contact 922b. The enabled unilateral conducting gate 902 cooperates with the capacitor 910 in a known manner to embody a signal peak detector. The STRB pulse following the input signal, after a delay effect by the multivibrator 919, cycles the commutator 920, thereby opening the contacts 922b, 924b, and 926b, and closing the contacts 922a, 924a, 926a.

If the next pulse occurs in the expected, proper time interval, and is larger than the first signal, the necessary conditions verifying that the systolic pressure point has been encountered are met. The amplitude of the second pulse is stored in a capacitor 916, with the unilaterally conducting enabled switch 904 and the capacitor 916 acting as a peak detector. As the assumed voltage across the capacitor 916 (the peak value of the second pulse) is larger than the voltage stored in the capacitor 910 (the peak value of the first pulse) for a permanent systolic triggering operation, a difference amplifier 912, connected to the capacitors 910 and 916, is adapted to generate a positive output voltage. This positive voltage is connected by the closed contact 926a to the lead 948, and comprises a high comparison output (CMPR–O) signal.

Since the second pulse occurred in a proper time slot, the STRB, WDOW, CMPR–O, and READ signals are all coincidentally high and an AND gate 602 is switched. The enabled output of the AND gate 602 sets and locks a flip-flop 670 thereby deenergizing the "O" output terminal thereof. The low "O" output of the flip-flop 670 disables an AND gate 658 connected in series with the reset terminal of the systolic triggering flip-flop 620. Accordingly, except for a reset signal acting through an OR gate 664 at the end of a complete cycle of operation, no further system action can reset the systolic triggering flip-flop 620. The permanently set systolic flip-flop 620 ensures that the high SYS–S/H signal produced by the DSCGE pulse from the first input blood flow signal, will remain on the lead 630 to lock up the systolic meter 740 for the remainder of the blood pressure reading cycle of operation.

Turning now to the possible irregular or spurious systolic triggering patterns, assume that the second pulse did not arrive in a proper time slot, indicative of a spurious first pulse. This is detected by an AND gate 690 receiving a W.STRB pulse generated by the first signal without receiving a gate disabling, relatively low signal from a monostable multivibrator 695 responsive to the discharge pulse of the expected following second pulse. Accordingly, the AND gate 690 becomes fully enabled should the second pulse fail to appear and operates to reset the systolic triggering flip-flop 620 through OR gate 652, AND gate 658 and OR gate 664. Responsive thereto, the SYS–S/H signal goes low and the meter 740 resumes tracking the instantaneous PRSSR value. It is noted that the storage of the peak value of the spurious first pulse by the circuit 900 will cause no system problem. Permanent setting of the flip-flop 620 cannot occur on the next incoming blood pulse signal since there will be no coincidentally occurring WDOW pulse to switch the AND gate 602. Also, the capacitor 910 will be discharged in sufficient time to attain a proper new value in the manner disclosed below.

For the other irregular case to be considered, i.e., the situation where a second input pulse is received during a proper time interval, but is smaller than the first signal, the voltage stored in the capacitor 916 is less than that stored in the capacitor 910. The output of the difference amplifier 912 is therefore negative, as is the CMPR–O output signal. Hence, locking of the meter 740 does not transpire since the negative CMPR–O signal inhibits switching of the meter locking AND gate 602.

Figure 6:
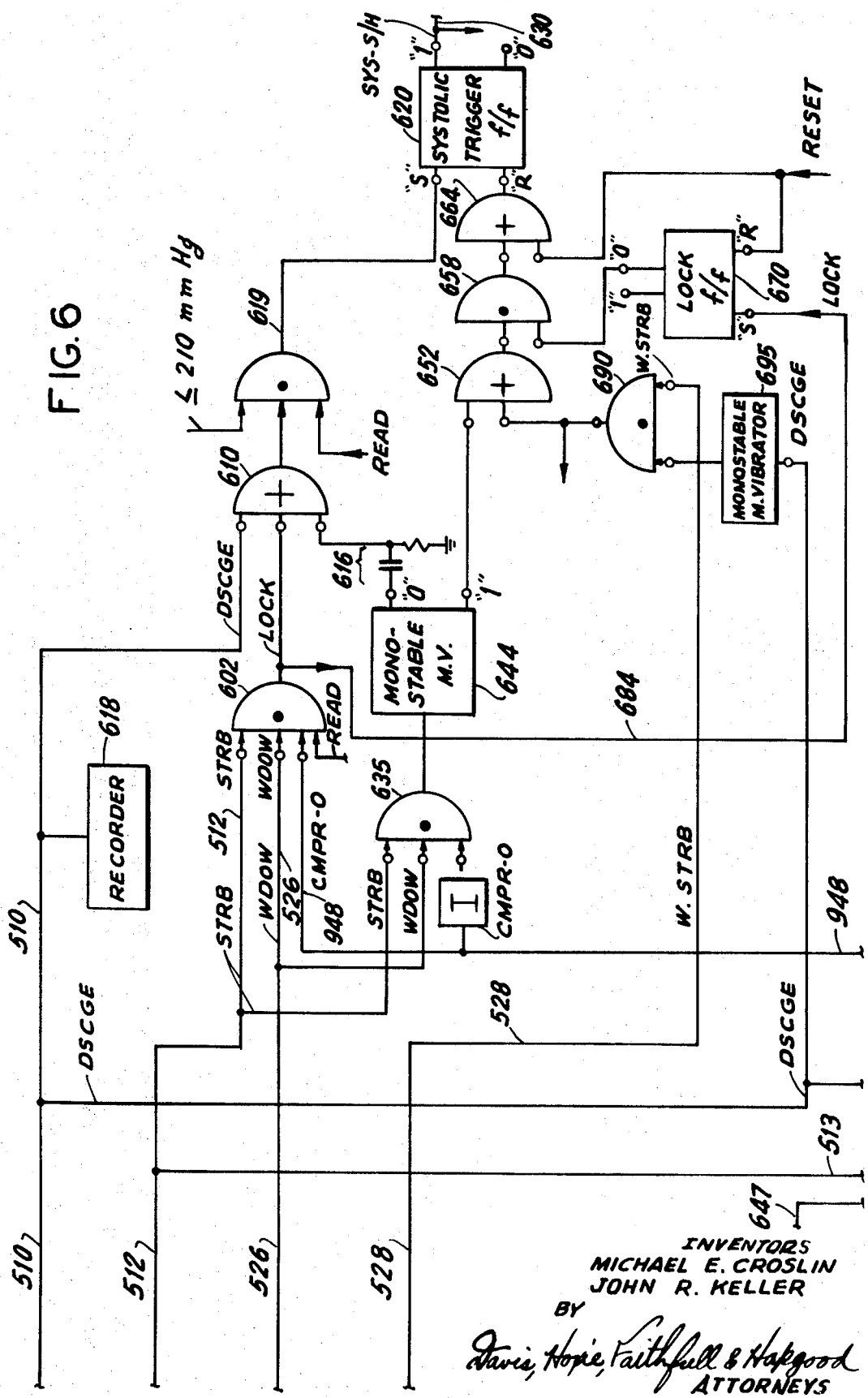

For the case under consideration, the circuitry of FIGS. 6 and 9 is adapted to treat the first (larger) input signal as being spurious and to consider the second signal as being a new "first" pulse in the requisite sequence of two. Accordingly, an AND gate 635 is switched following the smaller second pulse by the high STRB and WDOW pulses, and by an inverted CMPR–O signal. The AND gate 635 pulses a monostable multivibrator 644 which first resets the systolic triggering flip-flop 620 acting through the OR gate 652, and the AND gate 658, and the OR gate 664 and, shortly thereafter, resets the flip-flop 640 through an alternating current coupling network 616, the OR gate 610 and the AND gate 629. The resulting short low voltage excursion of the SYS–S/H signal (a temporarily low "1" output of the triggering flip-flop 620) allows the systolic pressure meter 740 to rapidly attain the PRSSR value obtaining when the second (i.e., new "first") input signal is encountered.

When the third (treated as a new "second") input is generated by logarithmic amplifier 635, the peak value thereof is stored in the capacitor 910 under control of the commutating switch 920 and its associated "b" contacts. More specifically, the discharge pulse associated with the third input signal gates on a transistor 908 for the duration of the DSCGE pulse connected thereto by the now closed contact 924b. The voltage stored in the capacitor 910 thus discharges from its former value corresponding to the peak amplitude of the spurious first pulse during the discharge interval. Following termination of the DSCGE signal the transistor 908 is nonconductive such that the peak amplitude of the third input signal may be inserted in the capacitor 910 by peak-detecting action, even if the amplitude of this signal is smaller than that of the first pulse. If the third (new "second") signal is properly larger than the second (new "first") signal, the output of the difference amplifier 912 is negative, but is inverted by the element 918 and appears as a positive CMPR–O comparison output signal on the lead 948 via the closed contact 926b. As the third pulse was assumed to occur in a proper time slot, the provisional systolic pressure reading is verified and the flip-flop 620 is locked to the set state by the gates 602, 610 and 619, hence also locking the systolic pressure display meter 740 in the manner described above.

If the third pulse was smaller rather than larger than the second, the second pulse would be treated as spurious and the third pulse treated as a new provisional systolic pressure indicating "first" signal. The commutating switch 920 and the associated contacts 922, 924, and 926 automatically count the input signals and energize the proper gate 902 or 904, the proper capacitor discharging transistor 908 or 914, and selectively invert the output of the difference amplifier 912 depending upon whether an odd or even number of input pulses have been received. Thus, any number of spurious signals can be rejected by the logic circuitry of FIGS. 6 and 9. The circuitry also accommodates a missing third or successor signal (logically considered as an expected "second" signal) since, for such an occurrence, the AND gate 690 resets the flip-flop 620, in the above-described manner, allowing the meter 740 to resume tracking the PRSSR.

Figure 7:
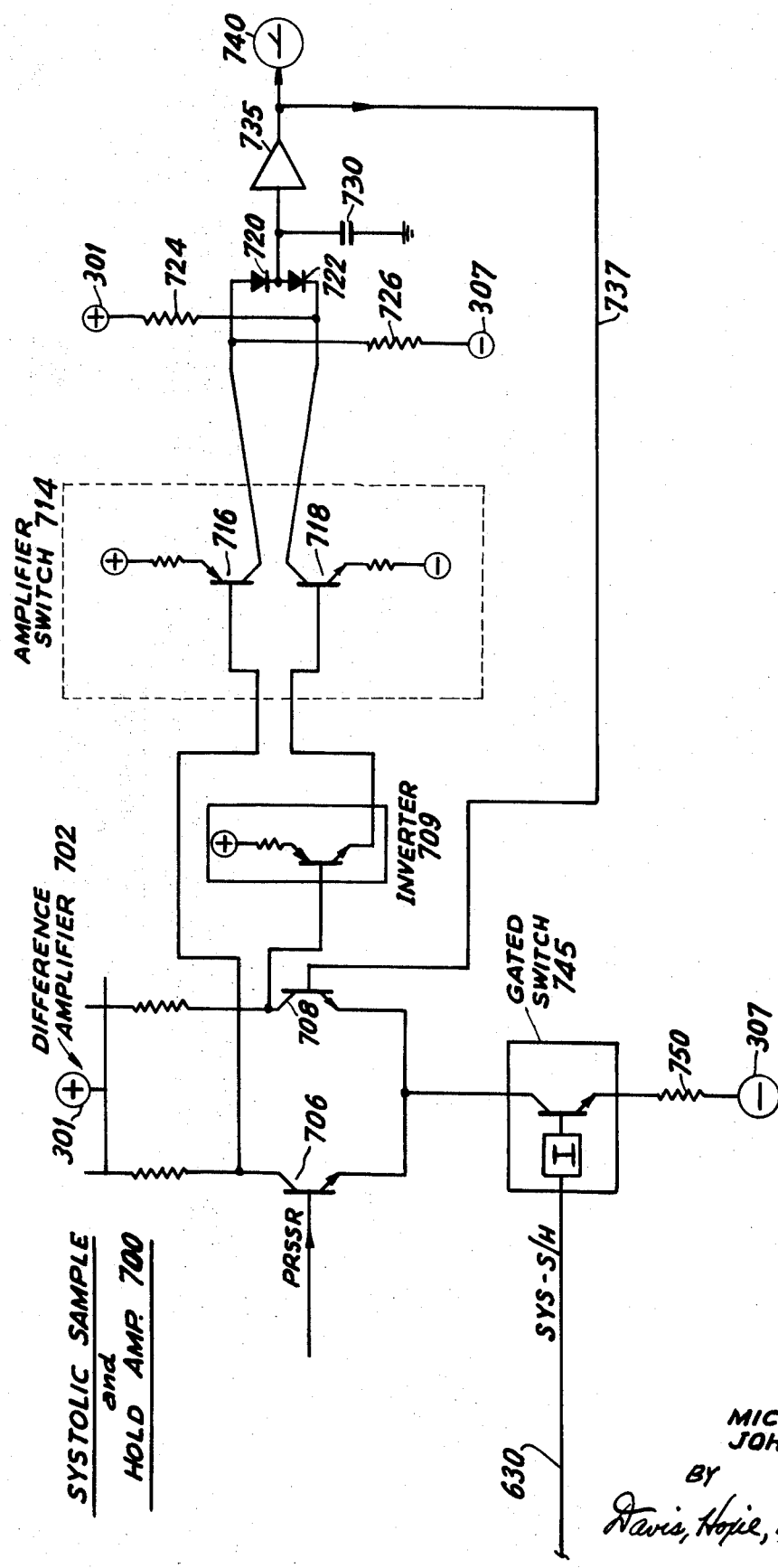

The systolic sample and hold amplifier 700 is depicted in detail in FIG. 7 and comprises feedback amplifier circuitry for locking the meter 740 to a PRSSR reading when the SYS–S/H signal is high, and for allowing the meter 740 to attain and track the instantaneously changing value of the PRSSR signal when the SYS–S/H signal is low. The circuit 700 includes a difference amplifier 702 which includes two transistors 706 and 708 connected in the usual configuration having their emitters connected to a common resistance 750 via a gated switch 745 which is rendered conductive when the SYS–S/H signal is low. When the SYS–S/H signal is low (tracking, or sampling mode) the meter 740 is set to, and tracks the incoming PRSSR signal under control of a closed feedback loop which includes the error-determining difference amplifier 702, an amplifier and switch 714, two cascaded diodes 720 and 722, a capacitor 730 which stores the occluding pressure indicating PRSSR voltage therein, and an amplifier 735 having a high input impedance.

Any difference in voltage between the PRSSR signal and the voltage displayed by the meter 740 (aside from any constant scaling factor) is automatically obviated by conventional servo action. For example, if the display voltage exceeds the PRSSR signal, a voltage increase is generated at the collector of the difference amplifier transistor 706, and a voltage decrease appears at the collector of the transistor 708. These voltage increments decrease conduction in a transistor 716 in the circuit 714, and increase condition in a transistor 718. Thus, a net charge is drawn out of the capacitor 730 by way of the diode 722. The voltage across the capacitor 730 thereby decreases, and this decreased voltage passes to the meter 740 by way of the amplifier 735. Accordingly, the meter display and PRSSR signals are brought into equilibrium. A similar analysis shows that for the other possible error signal condition, i.e., when the PRSSR signal is greater than the meter 740 voltage, conduction in the transistors 716 and 718 respectively increases and decreases, and a net charge is inserted into the capacitor 730 via the diode 720, thus increasing the meter voltage.

When the SYS–S/H signal goes high (hold mode) the switch 745 is opened and the transistors 706 and 708 are rendered nonconductive. The resulting increased voltage at the collectors of the transistors 706 and 708 renders the two transistors 716 and 718 included in the circuit 714 nonconductive. Accordingly, the two diodes 720 and 722 each become reverse biased by two resistors 724 and 726 which are respectively connected to the voltage sources 301 and 307. Thus, the feedback loop is broken, and the voltage on the capacitor 730, and also the voltage displayed by the meter 740 which is connected to the capacitor 730 through the amplifier 735, will not change. Thus, because of the high input impedance of the amplifier 735, which may advantageously comprise an input field effect transistor arranged in a feedback configurated such that only a fraction of a picoampere is drawn from the capacitor, and also in view of the high impedance presented to the capacitor 730 by the reversed biased diodes 720 and 722, the discharging time constant for the capacitor 730 is very long. Thus, the meter 740 will continue to display, without significant change over a long time interval, the PRSSR voltage obtaining when the SYS–S/H signal went high.

The diastolic hold and compare logic circuit 1000 (FIG. 10) receives the input blood flow signal from the logarithmic amplifier 635 pulses via the lead 640. In one branch of the circuit 1000, the pulses are reduced to 0.7 of their former amplitude by a scale network 1002 which may comprise a simple resistance voltage divider. The reduced pulses are then supplied to a peak detector 1004 which stores the peak amplitude of the largest pulse encountered in any given pressure-reading cycle of operation.

The input signals are also supplied to an envelope detector 1022 which stores the peak value of the most recently encountered input signal. The detector 1022 may comprise, for example, a peak detecting diode 1024 and capacitor 1030, and a transistor 1028 which discharges the capacitor 1030 through a resistance 1026 during the beginning portion of each new incoming signal under control of the corresponding discharge pulse.

The diastolic detecting logic circuit 1000 is enabled only if a provisional or final systolic reading has been taken, as indicated by a high SYS–S/H signal. If the systolic pressure value has not yet been reached, the SYS–S/H signal is low, becomes high upon inversion, and two transistors 1020 and 1032 are activated to clamp the outputs of the detectors 1004 and 1022 to ground. Instead of using the SYS–S/H signal in conjunction with the inverter 1024, the "0" output of the systolic triggering flip-flop 620 may be directly employed.

When an incoming pulse having a peak value less than 0.7 of the largest former pulse is encountered, a difference amplifier 1008 responds to the larger voltage output from the scaled peak detector 1004 than is present at the output of the detector 1022 by generating a positive signal which partially enables an AND gate 1013. Thereafter, the STRB pulse generated by each incoming signal fully activates the AND gate 1013, with such STRB signals thus effectively being passed by a lead 1016 to the diastolic detection logic circuit 1100.

The circuit 1100 employs and AND gate 1102 to pass the STRB pulses when the system is in a proper state for diastolic reading, i.e., when the switch 1135 is set to a read mode and after the arterial occluding pressure in the cuff 32 is less than 110 mm.Hg. A counter 1114 responds to the input pulses from the gate 1102 and more particularly to the incidence of two STRB pulses from the circuit 1000, after the above-described 0.7 amplitude condition has been met, by setting a diastolic triggering flip-flop 1122. The resulting high voltage on the "1" output terminal (DIA–S/H of the flip-flop 1122 changes the diastolic sample and hold amplifier 1200 from a track to a hold mode, and locks the diastolic meter 1240 to the proper diastolic reading. The circuit 1200 functions in a manner identical to the systolic 700 and will not be considered further.

When the systolic and diastolic pressure indicating meters 740 and 1240 are locked to their respective values, indicative of an end to a complete cycle of operation, the high DIA–S/H signal is employed to trigger a monostable multivibrator 880. The resulting relatively high output from the multivibrator 880 passes through an OR gate 882 and gates on a switch 890 allowing current to pass through the valve solenoid winding 28. This opens the normally closed valve 26 and rapidly relieves pressure in the large cuff pneumatic system. The solenoid 28 may also be energized at the discretion of the operator, e.g., in an emergency situation, by closing the exhaust switch 894 at any time.

When the pressure decreases below 30 mm. Hg., the output of the level-sensing circuit difference amplifier 830 goes low and resets the flip-flop 852 via an inverter 851, thereby opening switch 862 and deenergizing the solenoid winding 36. This permits the valve 34 to return to its normally open state. Pressure in the small cuff 60, and in the associated pneumatic detecting system, is thus rapidly relieved through the open valves 34 and 28. The valve 26 returns to its normally closed state after the multivibrator 880 times out. To clear the meters 740 and 1240, the operator throws the switch 1135 from its read to its reset state to reset all flip-flops and memory elements. The composite arrangement is then ready to begin a new pressure reading cycle of operation.

The above-described system depicted in FIGS. 4 through 12, utilized in conjunction with the pneumatic apparatus of FIG. 1, has thus been shown by the above to automatically read and display a subject's characteristic diastolic and systolic blood pressures. Such readings may be taken by nonskilled personnel, and yield reliable, accurate and reproducible results.

It is to be understood that the above-described arrangement is only illustrative of the principles of the present invention. Numerous modifications thereof will be readily apparent to those skilled in the art without departing from the spirit and scope of the invention. For example, the occluding cuff 32 and the distal-detecting cuff 60 may operate on an artery on any human extremity. For example, the cuffs may be placed on the female artery on a subject's leg.

In addition, it is observed that the subject's pulse rate may be directly determined by the above-described apparatus since a number of electrical signals are generated once each cardiac cycle, e.g., the DSCGE and STRB pulses Such pulses may be directly displayed on a known time base, for example, via a strip chart recorder 618 shown in FIG. 6. Alternatively, a rate responsive circuit, such as a gated low pass filter and an output latching circuit, may be employed.

It is claimed:

1. In combination in a sphygmomanometer for automatically determining a subject 's blood pressure, an occluding cuff, a detecting cuff adapted for use distal to said occluding cuff, closed detecting pneumatic means connected to said detecting cuff, means for inflating and deflating said occluding and detecting cuffs, detecting transducer means included in said closed pneumatic system, pressure transducer means for detecting the pressure in said occluding cuff, systolic pressure-indicating means, first circuit means for selectively connecting said pressure transducer means to said systolic pressure indicating means, and second circuit means connected to said detecting transducer means for selectively isolating said systolic pressure indicating means from said pressure transducer means, wherein said second circuit means includes means responsive to a first input signal generated by said detecting transducer means for provisionally isolating said systolic pressure-indicating means from said pressure transducer means such that said systolic pressure indicating means retains a reading when said first pulse occurred, said second circuit means further including means responsive to a second signal generated by said detecting transducer means within a predetermined time interval with respect to said first signal for finally isolating said systolic pressure indicating means to the value obtaining during the occurrence of said first input signal, wherein said second circuit means further comprises means for finally isolating said systolic pressure indicating means responsive to the amplitude of said second signal exceeding the amplitude of said first signal, said pulse amplitude responsive means included in said second circuit means comprising means for storing the peak amplitudes of consecutive pulses supplied by said detecting transducer means, difference responsive means for generating an output signal indicative of the larger of the stored pulse amplitudes, and commutating means for selectively steering signals supplied by said detecting transducer means to said peak amplitude storing means and for selectively inverting the output of said difference-detecting means.

2. A combination as in claim 1 wherein said second circuit means further includes means responsive to a first signal generated by said detecting transducer means and the absence of a following signal in a predetermined time interval following said first signal for reconnecting said pressure transducer means with said systolic pressure indicating means.

3. A combination as in claim 2 wherein said second circuit means further includes means responsive to two signals from said detecting transducer means occurring within a predetermined time interval of each other, with said second signal being smaller in amplitude than said first signal, for reconnecting and subsequently isolating said systolic pressure indicating means and said pressure transducer means.

4. In combination in a sphygmomanometer for automatically determining a subject's blood pressure, an occluding cuff, a detecting cuff adapted for use distal to said occluding cuff, closed detecting pneumatic means connected to said detecting cuff, means for inflating and deflating said occluding and detecting cuffs, detecting transducer means included in said closed pneumatic system, pressure transducer means for detecting the pressure in said occluding cuff, systolic pressure indicating means, first circuit means for selectively connecting said pressure transducer means to said systolic pressure indicating means, second circuit means connected to said detecting transducer means for selectively isolating said systolic pressure indicating means from said pressure transducer means, diastolic pressure indicating means, third circuit means for selectively connecting said pressure transducer means with said diastolic pressure indicating means, and fourth circuit means connected to said detecting transducer means responsive to a predetermined pattern of signals generated by said detecting transducer means for isolating said pressure transducer means from said diastolic pressure-indicating means, said fourth circuit means including peak detecting means for storing a signal proportionately to the peak value of the largest of all the signals generated by said detecting transducer means in the pulse train of a monitoring cycle of operation, envelope detecting means for storing a signal indicative of the peak value of the most recent signal generated by said detecting transducer means, and diastolic display locking means responsive to the signal stored in said peak-detecting means exceeding the signal stored in said envelope-detecting means for isolating said diastolic pressure-indicating means from said pressure transducer means.

5. A combination as in claim 4 wherein said diastolic display locking means further comprises counting means responsive to the coincidence of said stored value in said peak-detecting means exceeding said stored value in said envelope detecting means and the incidence of two input signals by said detecting transducer means following said coincidence for isolating said diastolic pressure indicating means from said pressure transducer means.

6. In combination in a sphygmomanometer for automatically determining a subject's blood pressure, an occluding cuff, a detecting cuff adapted for use distal to said occluding cuff, closed detecting pneumatic means connected to said detecting cuff, means for selectively inflating and deflating said occluding and detecting cuffs, detecting transducer means included in said closed pneumatic system, pressure transducer means for detecting the pressure in said occluding cuff, systolic pressure indicating means, first circuit means for selectively connecting said pressure transducer means to said systolic pressure indicating means, second circuit means connected to said detecting transducer means for selectively isolating said systolic pressure indicating means from said pressure transducer means, said detecting transducer means including a first temperature responsive, variable resistance element, means having two substantially identical chambers therein, one of said chambers being included in said detecting pneumatic means and the other of said chambers not being so included, said first variable resistance element being included in said chamber included in said closed pneumatic means, a second temperature responsive, variable resistance element included in said chamber not included in said closed pneumatic means, and a bridge having output and voltage energizing input nodes, said bridge circuit including said first and second variable resistance elements in differing branches thereof.

7. A combination as in claim 16 further comprising feedback amplifier means having an input connected to said bridge output nodes and an output connected to said bridge voltage energization input nodes.

8. A combination as in claim 6 further comprising a logarithmic amplifier connected to said bridge output nodes.

9. In combination in a sphygmomanometer, inflatable cuff means for selectively occluding a subject's artery, and for detecting blood pulses flowing in said artery, systolic pressure-indicating means, means for sensing the occluding pressure in said inflatable cuff means, gated means for connecting said pressure sensing means with said systolic pressure-indicating means, and means connected to said cuff means responsive to said cuff means detecting two blood pulses occurring within a predetermined time interval of each other, with said second pulse being greater than said first pulse, for signaling said gated means, said gating means including means responsive to said signal from said signaling means for isolating said systolic pressure indicating means from said pressure sensing means, said gated means provisionally isolating said systolic pressure indicating means responsive to the incidence of a first pulse from said signaling means, further comprising diastolic pressure-indicating means, additional gated means for connecting said pressure-sensing means with said diastolic pressure indicating means, and means connected to said cuff means and responsive to the incidence of a pulse detected by said cuff means having an amplitude a predetermined proportional amount less than the largest of all previous pulses detected by said cuff means for signaling said additional gated means, said additional gated means responsive to said signal from said diastolic signaling means for isolating said diastolic pressure indicating means from said pressure-sensing means.

10. A combination as in claim 9 wherein said proportional amount is approximately 0.7.

11. In combination in a sphygmomanometer, inflatable cuff means for selectively occluding a subject's artery and for detecting blood pulses flowing in said artery, diastolic pressure indicating means, means for sensing the occluding pressure indicating in said inflatable cuff means, gated means for selectively connecting said pressure sensing means with said diastolic pressure indicating means, peak-detecting means for storing a scaled replica of the amplitude of the largest pulse signal sensed by said cuff-detecting means in a monitoring cycle of operation, means for storing the amplitude of each pulse produced by said detecting means and means responsive to the peak amplitude stored in said last pulse amplitude storing means being a predetermined amount less than the output of said peak-detecting means for signaling said gated means, said gated means including means responsive to said signal from said signaling means for isolating said diastolic pressure indicating means from said pressure sensing means.